Dec. 15, 1959     E. P. MARKOWSKI     2,917,265
VIBRATION ISOLATOR

Filed Nov. 22, 1957     2 Sheets-Sheet 1

EDWIN P. MARKOWSKI
INVENTOR.

BY
Dike, Thompson, Sanborn & Bronstein
ATTORNEYS

Dec. 15, 1959　　　E. P. MARKOWSKI　　　2,917,265
VIBRATION ISOLATOR

Filed Nov. 22, 1957　　　　　　　　　　2 Sheets-Sheet 2

EDWIN P. MARKOWSKI
INVENTOR.

BY
Dike, Thompson, Sanborn & Bronstein
ATTORNEYS

United States Patent Office 2,917,265
Patented Dec. 15, 1959

2,917,265

VIBRATION ISOLATOR

Edwin P. Markowski, Dorchester, Mass., assignor to Barry Controls Incorporated, Watertown, Mass., a corporation of Massachusetts Application November 22, 1957, Serial No. 698,268

10 Claims. (Cl. 248—358)

This invention relates to a particular form of resilient support, more particularly, to a vibration isolator. A vibration isolator is a device to reduce the magnitude of vibration as it is transmitted from one structure to another. The vibration whose magnitude is reduced may be either a vibratory motion or a vibratory force. Vibration isolators are commonly used to support engines, pumps, and other apparatus to prevent the transmission of force from such equipment to the structure which supports it. Vibration isolators are also used to mount delicate equipment in aircraft, vehicles, ships, industrial plants and the like to protect such equipment from the vibratory motion existing where the equipment is used.

The principal elements of a vibration isolator are resilient means for supporting the load, and damping means for dissipating energy to prevent the vibration amplitude from becoming excessively great. It is difficult to combine both of these functions in a single mechanical element. In certain types of vibration isolators, it is convenient to employ one or more coil springs for supporting the load. The stiffness of such springs may be carefully controlled and predetermined to accomplish the desired function. Such a spring generally is undamped, and a separate energy dissipating means or damper must be used in conjunction therewith to attain optimum characteristics for the vibration isolator.

It is an object of this invention to construct the spring and damper from materials which are substantially unaffected by extremes of temperature and other environmental conditions. Isolators are frequently used in military aircraft and in other locations wherein extreme temperatures exist, and it is desirable that the operation of the isolators be independent of environmental conditions insofar as possible.

Another object of this invention is to provide a damped isolator in which the damping is effective for all directions of motion, whether such motion is in the vertical or horizontal direction. A still further object is to provide damping whose effectiveness may be adjusted at will, independently of other characteristics of the isolator, and in which the damping in the vertical and horizontal directions may be adjusted to different values if desired.

A further object of this invention is to provide a vibration isolator in which the spring and damping forces remain substantially unaffected when the mounted equipment experiences an appreciable displacement. In certain applications of isolators on equipment mounted in rockets and guided missiles, a substantially constant value of acceleration is sustained for a relatively long time. The effect of this acceleration upon the mass of the mounted equipment simulates the application of a steady force to the isolator and causes a steady displacement thereof. It is desirable that the resilient load supporting element remain operative during these conditions to afford vibration isolation and that the damper continue to function to prevent the occurrence of random vibration.

A still further object of this invention is to provide a damped vibration isolator of a design which can be constructed in a variety of sizes and shapes. Substantially the same characteristics can thus be attained, regardless of the size of the isolator and the weight of the mounted equipment.

Another object of this invention is to provide means for controlling the relative spring stiffnesses in the various directions of motion. Vibration isolation is attained by establishing the natural frequencies of an equipment upon its isolators with the appropriate relationship to the frequency of the vibration to the isolator. It is important that the natural frequencies in the several natural modes of vibration be considered. These natural frequencies can be modified by changing the isolator stiffnesses in the several directions. It is thus important to employ isolators whose stiffnesses are subject to ready modification.

Another object of this invention is to provide a spring and damper combination which is adapted to be embodied in an isolator capable of providing vibration isolation when installed in any position or attitude. Many types of isolators, which have been and are in common use, are adapted to operate only when the equipment is supported upon a horizontal surface and when the isolators are located underneath the mounted equipment. The maneuvering of certain types of military aircraft requires that isolators operate properly when the mounting surface is horizontal, vertical or inclined, and when the isolators are below, above or beside the mounted equipment.

Another object is to provide an arrangement in which a main spring resiliently supports the load in a vertical and horizontal direction, in which a horizontal damping spring aids the main load supporting spring in supporting the load at least in a vertical direction but in which the supported member is capable of moving horizontally with respect to the supporting member and independently of the damping spring, whereby the damping spring is not substantially distorted in said horizontal direction. This horizontal movement is damped by a horizontal damper held in damping relation with the supported member by said damping spring. Preferably the supported member is supported directly on the main load supporting spring, one end of the main spring is movable horizontally with the supported member, the other end of the main spring is movable horizontally with the supporting member, the damper is supported on the damping spring, and the supported member rests on the damper and is movable horizontally with respect thereto and to the damping spring.

Another object of the present invention is to provide an isolator which incorporates a main supporting spring and a horizontal damping spring aiding the main spring to support the load and in which the horizontal stiffness of the spring is substantially independent of the damping spring.

Other objects and advantages of the invention will be apparent to persons skilled in the art from the following description and the accompanying drawings in which.

Figure 1:
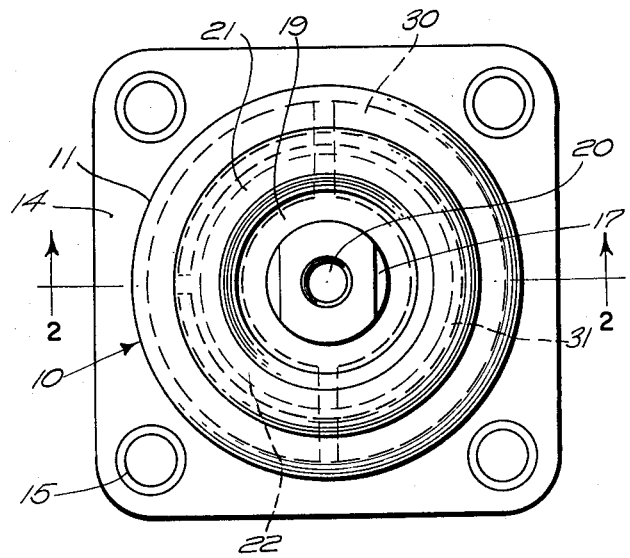
Fig. 1 is a top plan view of a preferred embodiment of this invention.
Figures 2, 3:
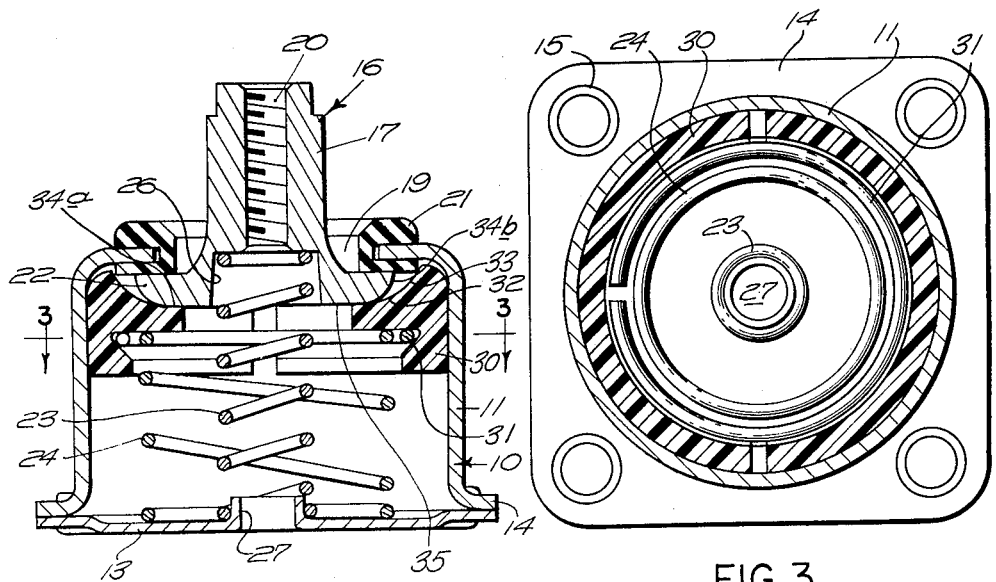
Fig. 2 is a section on line 2—2 of Fig. 1.
Fig. 3 is a section on the line 3—3 of Fig. 2.

In the embodiment illustrated in Figs. 1, 2 and 3, the supporting member of the isolator is the housing 10 which is in the form of a cylindrical casing 11 having a vertical axis of symmetry and a base plate 13 which normally lies in a horizontal plane. The casing 11 is provided with horizontally extending flanges 14 at its lower end, such flanges being disposed flat-wise with the base plate 13 and provided with apertures 15 extending through both the base plate 13 and flange 14 for securing the supporting member to the airframe structure or other structure used for supporting the equipment.

The supported member 16 is a rod 17 extending vertically in co-axial relationship with the cylindrical housing 11. The rod 17 extends through an opening 19 in the upper part of the housing and is provided with threads 20 for ready attachment of the equipment which is supported by the isolator. A grommet 21 made of rubber or other resilient material is provided to line the opening 19 and cushion any possible impacts of the rod 17 against the casing 11. The lower end of the rod 17 comprises an enlarged portion 22 which has a substantially flat lower surface.

The weight of the supported equipment is resiliently carried on inner 23 and outer 24 resilient elements, which are in the form of coil springs in the embodiment illustrated in Fig. 2. The upper end of the inner resilient element 23 nests within a cavity 26 on the lower face of the rod 17 and the lower end of the inner resilient element 23 rests against the base plate 13, being centered thereon by an eyelet 27 drawn into the center of the base plate. When the supported member 16 moves horizontally with reference to the supporting member 10, the inner resilient element 23 is deflected in the horizontal direction. A coil spring of the type illustrated has a characteristic horizontal stiffness and a characteristic vertical stiffness, the ratio of these two stiffnesses being determined by the dimensions of the spring. This ratio of stiffnesses can be controlled within the limitations imposed by the over-all dimensions of the isolator.

A damper 30 is interposed between the enlarged portion 22 of the supported member 16 and the upper end of the outer resilient element 24. It is free to slide vertically within the casing 11 as the supported member 16 moves vertically with reference to the supporting member 10. The damper 30 is formed in two or more segmental portions and is equipped with a single turn coil spring 31 which has an expansive tendency and continuously urges the damper segments against the inner wall of the casing 11. The force thus created introduces a frictional resistance to vertical movement of the damper 30 within the casing 11 and provides damping for vertical vibration. The degree of damping is controlled by the stiffness of the spring 31 and by the materials used to form the damper 30 and the casing 11.

The damper 30 has a depression 32 in the upper surface thereof which receives the enlarged portion 22 of the supported member 16. The depression 32 has a sloped side 33 extending from the bottom thereof upwardly and outwardly. The bottom damping surface 35 of enlarged portion 22 rests on surface 32 of the damper and has a flat portion 34a which extends outwardly into sloped side portion 34b. The upward slope of the sloped portion 34b is sharper than the upward slope of sloped side 33 of the depression. The lateral dimension of depression 32 is greater than the lateral dimension of the enlarged portion 22, thereby permitting lateral movement of portion 22 in depression 32 and with respect to damper 30. The sloped side of the depression limits horizontal displacement of member 16 with respect to damper 30 and member 10. When the supported member 16 moves horizontally relative to the supporting member 10, the portion 22 slides horizontally upon and with respect to the damper 30 within the depression formed on the upper face of the damper. The resilient elements 23, 24 share the weight of the supported equipment, the load carried by the inner resilient element 23 being transferred by this spring directly from the base plate 13 to the rod 17. The portion of the load carried by the outer resilient element 24 is transferred through the damper 30 to the enlarged portion 22 of the rod 17. A normal force thus exists at the inter-face between the portion 22 and the damper 30. Horizontal motion of the supported member 16 relative to the supporting member 10 is resisted by the friction force which is proportional to the normal force existing at the inter-face between portion 22 and damper 30. Damping for vibration in the horizontal direction results from this friction force. Spring 24 acts both as a vertical load supporting spring and a horizontal damping spring.

If it is desirable to provide a small degree of damping in the horizontal direction, the outer resilient element 24 is designed with relatively little stiffness so that the normal force between portion 22 and damper 30 is small. The major portion of the load is thus carried by the inner resilient element 23 which introduces no appreciable damping into the vibrating system. If it is desired to introduce a large degree of damping for horizontal motion of the supported member, the outer resilient element is made relatively stiff so that the normal force between the enlarged portion 22 and damper 30 becomes great.

One of the important features of the invention is that the outer resilient element 24 is not deflected horizontally when the supported member moves horizontally with respect to the supporting member. Only the inner resilient element is deflected under these circumstances. The stiffness of the isolator in the horizontal direction is thus a function only of the horizontal stiffness of the inner resilient element 23. The ability to control the stiffnesses of the inner 23 and outer 24 resilient elements independently contributes versatility to the isolator because both the horizontal damping and the horizontal stiffness can be varied in this manner.

Figure 4:
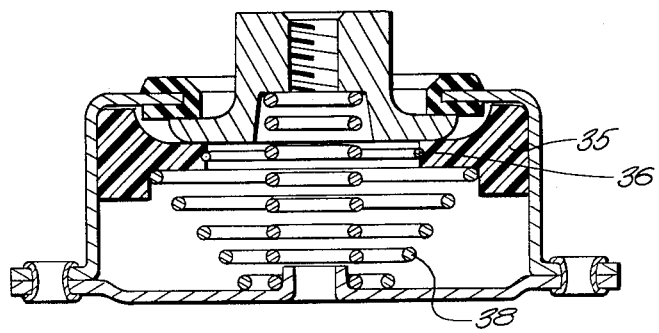
Fig. 4 is a view similar to Fig. 2 but showing a modified embodiment of the invention.

The embodiment illustrated in Fig. 4 includes many of the features described above with respect to Figs. 1, 2 and 3. The damper 35 has a somewhat simplified form which includes provision for a smaller diameter expansive spring 36 disposed at the inner diameter of the damper. The outer resilient element 38 is a conical spring so that the coils thereof may telescope upon a large vertical deflection, thus making it possible to use a larger number of coils of wire in the outer resilient element.

Figure 5:
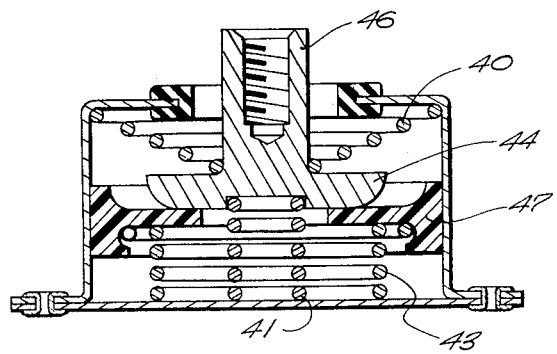
Fig. 5 is a view similar to Fig. 2 but showing a still further modified embodiment of the invention.

The embodiment of the invention illustrated in Fig. 5 is intended for application to highly maneuverable aircraft where the load on the isolators may be upward or laterally as well as downward. In the embodiments illustrated in Figs. 1 to 4, the main resilient elements are located underneath the supported member and the isolators operate properly only when the load is applied downward from the supported member to the resilient elements. In the embodiment illustrated in Fig. 5, an upper spring 40 is included to supplement the inner resilient element 41 and the outer resilient element 43. These resilient elements are preferably designed so that their free lengths are substantially greater than the space allocated within the isolator. The enlarged portion 44 of the supported member 46 is thus confined between partially compressed resilient elements which become capable of supporting a load applied not only in the downward direction but also in the upward and horizontal directions.

It is possible with the embodiment illustrated in Fig. 5 to achieve a substantially greater degree of versatility in controlling the damping force. The damping which becomes operative for horizontal vibration results from the normal force between the enlarged portion 44 and the damper 47. As in the embodiment illustrated in Figs. 1 to 3, this normal force is controlled in part by the relative stiffnesses of the inner 41 and outer 43 resilient elements. In the embodiment illustrated in Fig. 5, this horizontal damping is controlled not only by the preceding considerations but also by the stiffness of the upper spring 40. The force exerted by the upper spring 40 is transmitted across the interface between members 44 and 47, thereby introducing added friction in the horizontal direction.

The damper in all embodiments is resiliently supported on the housing 10 by resilient means 24 in Figs. 1 and 3, 38 in Fig. 4 and 43 in Fig. 5 independently of the supported member in the sense that such resilient means does not support the damper through the supported member. Also the spring 23 in Figs. 1 to 4 and 41 in Fig. 5 acts between the supported and supporting members independently of the damper in the sense that it does not act between them through the damper as in the case of spring 24 in Figs. 1 to 3, 38 in Fig. 4 and 43 in Fig. 5. Both springs function to support the supported member on the supporting member in substantially the same vertical direction. However, springs 23 and 41 also support the supported member in a horizontal direction whereas springs 24, 38 and 43 do not.

Although I have described and illustrated certain preferred embodiments of my invention, it will become apparent to persons skilled in the art that the scope of the invention is defined by the appended claims:

I claim:

1. In a vibration isolator, supporting and supported members, said supporting member comprising a housing having an opening at the top and a side wall, said supported member extending through said opening into said housing and being spaced from the edge of said opening and from said side wall, a damper within said housing, first load supporting resilient means interposed and acting between said damper and said housing and resiliently supporting said damper on said housing, said supported member having a damping surface generally lateral to the line of action of said first load supporting resilient means, said damper being interposed between said first resilient means and said damping surface, said supported member being supported on said damper with the lateral damping surface thereof resting on a damping surface of said damper, said first resilient means urging said damping surface of said damper upwardly into damping relationship with said lateral surface of said supported member and contributing to the resilient support in a vertical direction of said supported member on said housing, said supporting member being movable in said lateral direction with respect to said housing, said damper and said first resilient means, second resilient means interposed between said supported member and said housing and acting therebetween independently of said damper to resiliently support the supported member on the housing in the same general vertical direction as said first resilient means, one end of said second resilient means being movable in said lateral direction with said supported member and the other end being movable in said lateral direction with said housing.

2. In a vibration isolator, supporting and supported members, said supporting member comprising a housing having an opening at the top and a side wall, said supported member extending through said opening into said housing and being spaced from the edge of said opening and from said side wall, a damper within said housing, first resilient means interposed between said damper and said housing to resiliently support said damper on said housing, said supported member being supported on said damper and slidable thereon and with respect thereto horizontally, said first resilient means urging said damper upwardly into damping relationship with said supported member and contributing to the resilient support in a vertical direction of said supported member on said housing through said damper, and second resilient means interposed between said supported member and said housing and acting therebetween independently of said damper to resiliently support said supported member on said housing in the same general vertical direction as said first resilient means, one end of said second resilient means being movable with said supported member and the other end being movable with said housing.

3. A vibration isolator according to claim 2, the horizontal stiffness of said isolator being dependent upon the horizontal stiffness of said second resilient means and being substantially independent of said first resilient means, the stiffness of said first resilient means being of a different magnitude than the stiffness of said second resilient means.

4. In a vibration isolator, supporting and supported members, said supporting member comprising a housing having an opening at the top and a side wall, said supported member extending through said opening into said housing and being spaced from the edge of said opening and from said side wall, a damper within said housing movable vertically with the supported member and with respect to said wall, a resilient member urging said damper into frictional damping relationship with said side wall, first resilient means interposed and acting between said damper and a wall of said housing to support said damper on said supporting member, said supported member having a portion supported on the upper surface of said damper and slidable thereon and with respect thereto horizontally, said first resilient means urging said damper upwardly into damping relationship with said portion of said supported member and contributing to the resilient support in a vertical direction of said supported member, and second resilient means interposed and acting directly between said supported member and said last mentioned wall of said housing to resiliently support said supported member in the same general vertical direction as said first resilient means, one end of said second resilient means being movable with said supported member and the other end being movable with said housing, whereby the relative stiffness of said first and second resilient means may be chosen to provide the desired resilience of the isolator horizontally and to control the degree of friction between said supported member and said damper.

5. In a vibration isolator, supporting and supported members, said supporting member comprising a housing having an opening at the top and a generally vertical side wall, said supported member extending through said opening into said housing and being spaced laterally from the edge of said opening and from said wall, said generally vertical wall comprising opposite portions, a damper within said housing and interposed between said opposite portions and movable generally vertically with said supported member and with relation to said supporting member in sliding engagement with said wall, first resilient means resiliently supporting said damper on said housing, said supported member being supported upon an upper surface of said damper and slidable thereon and with respect thereto horizontally, said first resilient means urging said damper upwardly into damping relationship with said supported member and contributing to the support in a vertical direction of said supported member on said housing and second resilient means interposed and acting directly between said supported member and said housing and cooperating with said first resilient means to resiliently and simultaneously support said supported member on said housing in said vertical direction.

6. In a vibration isolator, supporting and supported members, said supporting member being a hollow cylindrical housing having a generally vertical wall and an opening at the top, said supported member extending into said opening and being spaced laterally from the edge of said opening and from said generally vertical wall, a damper slidable vertically and axially with said supported member within said cylinder, said damper being in damping contact with said generally vertical wall of said cylinder, first load supporting resilient means interposed between said damper and an end wall of said housing for resiliently supporting said damper on said housing, said supported member being supported on said damper and slidable thereon and with respect thereto horizontally, said first resilient means urging said damper upwardly into damping relationship with said supported member and contributing to the resilient support in a vertical direction of said supported member on said housing, and second resilient means interposed between said supported member and said end wall of said housing and acting therebetween independently of said damper, said second resilient means cooperating with said first resilient means to resiliently support said supported member on said housing in said vertical direction, said horizontal sliding movement of said supported member being with relation to said first resilient means and said housing, whereby the horizontal stiffness of said isolator is substantially independent of said first resilient means.

7. In a vibration isolator, supported and supporting members, said supporting member comprising a housing having an opening at the top and a generally vertical side wall, said supported member extending through said opening into said housing and being spaced laterally from the edge of said opening and from said wall, a damper within said housing, first resilient means interposed between said damper and a horizontal wall of said housing to resiliently support said damper on said housing independently of said supported member, said supported member being supported on said damper and slidable thereon and with respect thereto horizontally, said first resilient means urging said damper upwardly into damping relationship with said supported member and contributing to the resilient support in a vertical direction of said supported member on said housing, and second resilient means interposed between said supported member and said horizontal wall of said housing and acting therebetween independently of said damper to resiliently support said supported member in said vertical direction.

8. In a vibration isolator, supporting and supported members, said supporting member comprising a housing having an opening at the top and a generally vertical side wall, said supported member extending through said opening into said housing and being spaced laterally from the edge of said opening and from said wall, resilient load carrying means interposed between said housing and said supported member comprising at least two resilient elements, a damper within said housing and slidable axially with said supported member and with relation to said housing in damping contact with said generally vertical wall of said housing, said damper being interposed between one of said resilient elements and said supported member and being resiliently supported on said housing by said one resilient element, said supported member being supported on said damper and being slidable on and with respect to said damper upon motion of said supported member relative to said housing in a direction normal to the sliding motion of said damper within said housing, said first resilient element urging said damper upwardly into damping relationship with said supported member and contributing to the resilient support of said supported member on said housing in a direction in which said damper slides, the other resilient element acting between said supported member and said housing independently of said damper and resiliently supporting said supported member on said housing in the same general direction as said first resilient element.

9. In a vibration isolator, supporting and supported members, said supporting member being in the form of a cylindrical casing, the supported member extending at least partially into said casing coaxially therewith, resilient load supporting means interposed between said casing and said supported member comprising at least two resilient elements, a damper within said casing slidable with said supported member and with respect to said casing in said coaxial direction, said damper being interposed between one of said resilient elements and said supported member and being supported on said housing by said one resilient element, said supported member being supported on said damper and being slidable upon and with respect to said damper upon motion relative to said casing in a direction normal to said coaxial direction, said first resilient element urging said damper upwardly into damping relationship with said supported member and contributing to the support of said supported member on said housing through said damper, the other resilient element acting between the supported member and said housing independently of said damper to resiliently support said supported member on said housing in the same general direction as said first resilient element.

10. In a vibration isolator, supporting and supported members, said supporting member comprising a housing having an opening at the top and a generally vertical side wall, said supported member extending through said opening into said housing and being spaced laterally from the edge of said opening and from said wall, resilient load supporting means interposed between said housing and said supported member comprising at least two resilient elements, a damper within said housing slidable axially with said supported member and with respect to said housing and in contact with said generally vertical wall of said housing, a resilient member arranged to yieldingly urge said damper against said vertical wall, said damper being interposed between one of said resilient elements and said supported member and being supported on said housing by said one resilient element, said supported member being supported on said damper and slidable upon and with respect to said damper upon motion relative to said housing in a direction normal to the sliding motion of said damper within said housing, said first resilient element urging said damper upwardly into damping relationship with said supported member and contributing to the support of said supported member on said housing in said axial direction, the other resilient element acting between said supported member and said housing independently of said damper to resiliently support said supported member on said housing in the same general direction as said first resilient element.

References Cited in the file of this patent
UNITED STATES PATENTS

| | | |
|---|---|---|
| 2,683,015 | Campbell | July 6, 1954 |
| 2,778,628 | Johnson | Jan. 22, 1957 |

FOREIGN PATENTS

| | | |
|---|---|---|
| 772,419 | Great Britain | Apr. 10, 1957 |